(12) United States Patent
Chang et al.

(10) Patent No.: US 6,789,079 B2
(45) Date of Patent: Sep. 7, 2004

(54) INTEGRATED SERVICE PLATFORM

(75) Inventors: Da-Yi Chang, Kaohsiung (TW); Chun-Hung Lin, Hsinchu (TW); Kun-Pei Li, Miaoli (TW); Hsiu-Lan Ting, Hsinchu (TW); Kung-Cheng Tu, Kaohsiung (TW); Mao-Shing Sun, Taipei (TW)

(73) Assignee: Macronix International Co., Ltd. (TW)

( * ) Notice: Subject to any disclaimer, the term of this patent is extended or adjusted under 35 U.S.C. 154(b) by 395 days.

(21) Appl. No.: 09/971,842

(22) Filed: Oct. 5, 2001

(65) Prior Publication Data

US 2003/0069885 A1 Apr. 10, 2003

(51) Int. Cl.[7] .............................................. G06F 17/30
(52) U.S. Cl. ............................ 707/10; 707/3; 707/100; 709/225
(58) Field of Search ..................... 707/1–10, 100–104.1, 707/200–206; 709/223–227; 713/202; 700/96, 91

(56) References Cited

U.S. PATENT DOCUMENTS 5,918,232 A * 6/1999 Pouschine et al. ...... 707/103 R
6,012,067 A * 1/2000 Sarkar .................... 707/103 R
6,125,363 A * 9/2000 Buzzeo et al. ............. 707/100
6,295,535 B1 * 9/2001 Radcliffe et al. ............ 707/10

OTHER PUBLICATIONS

Martin Hard Wick et al., Sharing Manufacturing Information in Virtual Enterprises, Feb. 1996, Communications of the ACM, 46–54.*

* cited by examiner

Primary Examiner—Shahid Alam
Assistant Examiner—Jean Bolte Fleurantin
(74) Attorney, Agent, or Firm—Dickinson Wright PLLC

(57) ABSTRACT

The present invention discloses an integrated service platform (ISP). Under the real-time mode, the ISP of the present invention comprises the devices of: an engineering data analysis database (EDB); an area controller database (AC Database); a web server; and client computers. Under the mode of accessing data in a certain period of time, the present invention comprises the devices of: an EDB; an AC Database; a loader; a web server; and client computers. The application of the ISP of the present invention allows users on the client sites to access the data they want with browsers. Thus, no disturbance of the maintenance on the client sites would occur, because the browsers are used for accessing the data.

11 Claims, 3 Drawing Sheets

INTEGRATED SERVICE PLATFORM

FIELD OF THE INVENTION

The present invention relates to an integrated service platform (ISP), and more particularly, to an ISP of manufacturing execution system (MES) utilized in wafer fabs.

BACKGROUND OF THE INVENTION

According to the core business, the major wafer fabs can be divided into three categories. The first category is an IC Foundry, which emphasizes the manufacturing process technology and is client-service oriented. The second category is a dynamic random access memory (DRAM) factory, which is established by purchasing technologies, or has developed its own technologies but still relies on the orders transferred from its parent company so as to avoid the cyclic risk. The third category is an integrated device manufacturer. The companies in the third category need to own quite broad production lines in order to meet the demands from their own wafer fabs. In other words, they need to invest a lot of capital, manpower and working time on the improvement of product design, marketing/sales and manufacturing process, so that the operation threshold is quite high. Their strategies are mainly stressed on providing a total solution package for the downstream clients, i.e., providing an IC assembly for satisfying the needs of clients in one shot, so as to strive for long-term cooperative relationships with clients.

The wafer fabs mentioned in the aforementioned three categories all have to control product flows and information flows with computer integrated manufacturing (CIM) procedures, thereby properly utilizing all kinds of manufacturing resources. The so-called CIM is centralized in a database with the use of computers as a tool, so that, through computer networking, the information in the database can be transmitted to users speedily or an automatic system for entire production can be integrated from various automatic facilities. In January 1997, an article in Semiconductor International Journal reported that "the installation of a CIM system is mission-critical in the start-up of new fabs and in the on-going development of current ones," and that MES is the heart of CIM.

A MES is a real-time online computer system integrating all kinds of related information in the production process, and the MES comprises the functions of: data collection; tracing of work in process (WIP); material management; management of goods in stock; exception management; and quality management. Since the IC production is featured in complication manufacturing step, expensive processing equipment, numerous product varieties and short product life, IC manufacturers strongly need a MES for managing a production site so as to meet the ever-changing requirements from clients and to face the competition and channel of the e-age. A MES can help IC manufacturers collect on-site data, and can convert the data into useful information for controlling and managing the production site, thereby reaching the goals of automatic management and maximum efficiency for factories.

A MES is a very huge software system involved in very board knowledge fields, so that the money and the manpower spent on developing the MES are very astonishing. For example, Macronix International Co. Ltd. in Taiwan put its second fab into mass production in March of 1997, so that its production capacity and process technologies can further meet the market demands. While Macronix continuously expanded its capacity, it also cooperated with International Business Machine (IBM) for planning a CIM system by introducing one of the most advanced worldwide information technologies and tools, Poseidon Manufacturing Execution System, thereby achieving the advanced and total computerization, and providing a flexible and highly-integrated service.

Referring to FIG. 1, FIG. 1 is a structural diagram of Poseidon System. The Poseidon System 10 comprises subsystems of: a floor control 100; a basic record (BR) 110; a scheduling and bank control 120; a tool control system (TCS) 130; a central monitor 140; a report system 150; a transfer system 160; a statistical process control (SPC) 170; an engineering data analysis (EDA) 180; and an external interface 190, wherein the transfer system 160 further comprises a reticle stocker 162, an interbay transfer system 164 and an intrabay automated guided vehicle system 166, and furthermore, the external interface comprises a corporation information system (CIS) 192.

Just as described above, since the Poseidon System comprises a plurality of subsystems, users on the client sites are not able to obtain the information from these subsystems easily. The users usually have to install a special report system or use an artificial method to gather the information they want. Hence, if a network ISP is provided, the aforementioned disadvantage, that the users cannot access the data easily, can then be resolved.

SUMMARY OF THE INVENTION

According to the aforementioned background of the invention, it is not easy for users on the client sites to get the information located on the subsystems of Poseidon, and the users usually have to install a special report system or use an artificial method to obtain the information they need.

Hence, an object of the preset invention is to provide an ISP, which can be used as a portal website for each individual network subsystem, and each network subsystem has its own features and functions.

The other object of the present invention is to provide an ISP for users on the client sites to access the data they want with browsers. Just because the users use the browsers for accessing data, the maintenance of client sites would not become a disturbance.

According to the aforementioned objects of the present invention, the present invention thus provides an ISP. The ISP of the present invention comprises two modes for accessing data. The first mode for accessing data is real time, and the present invention under the real-time mode comprises: an engineering analysis database (EDB); an area controller database (AC Database); a web server connected to the EDB and to the AC Database; and a plurality of client computers connected the web server. The second mode for accessing data allows users to access the data in a certain period of time. The ISP of the present invention under the aforementioned mode of accessing data in a certain period of time comprises: an EDB; an AC Database; a loader connected to the EDB and to the AC Database; a web server having a structured query language (SQL) database connected to the loader; and a plurality of client computers connected to the web server.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
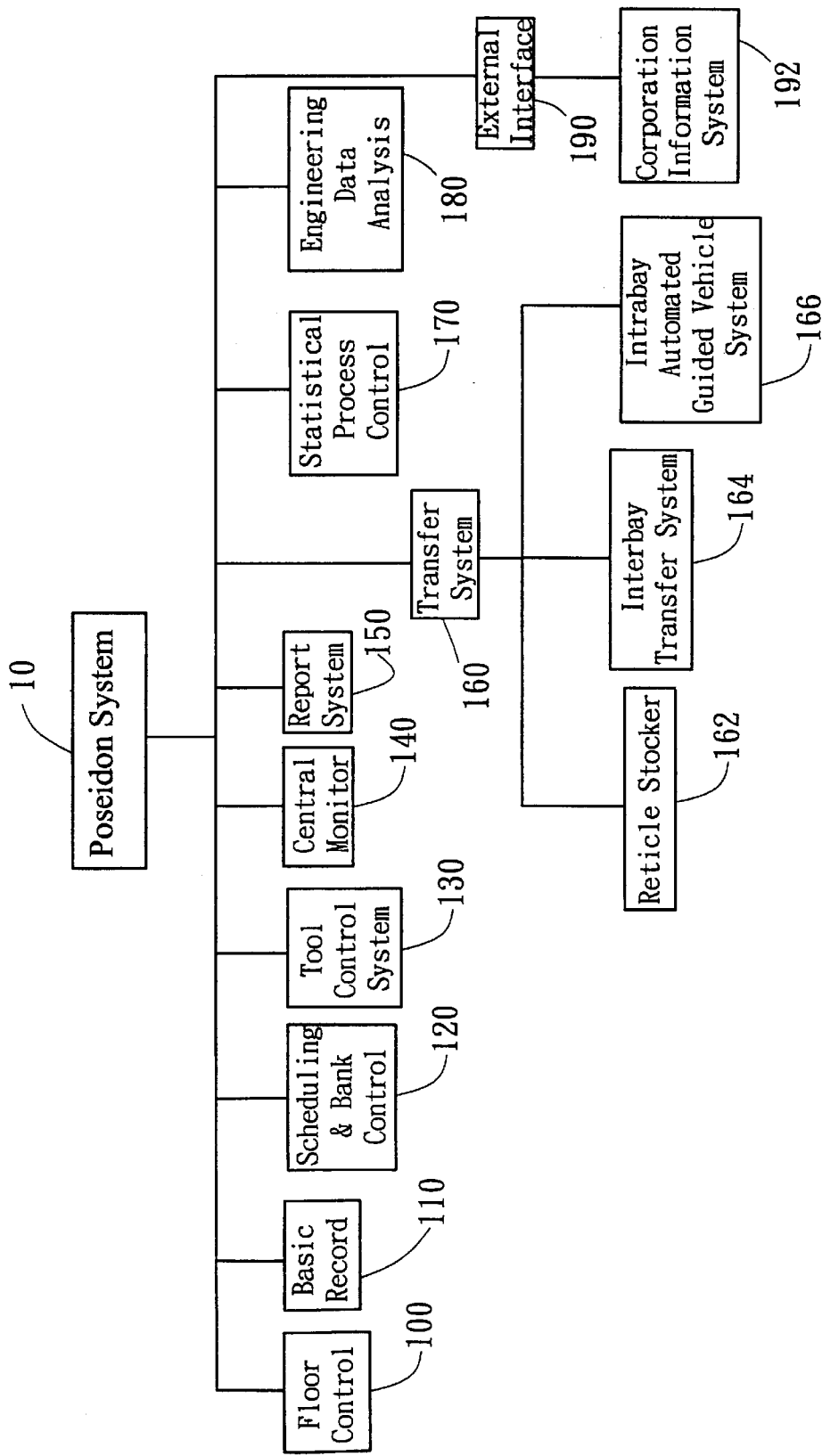
FIG. 1 is a structural diagram of the Poseidon System.

The present invention relates to an ISP used in an enterprise intranet. At first, the ISP uses the component object model (COM) concept from the latest version of Microsoft COM+ to develop the objects needed in the ISP system. COM+ objects have the multi-threading capability allowing multiple users to access data at the same time, and the program coded with COM+ objects has the advantage of parallel processing, thereby accelerating the execution of the program.

Secondly, the ISP of the present invention provides a website environment for users to access data, so that users on the client sites can access the data they want with browsers, and the browsers can be Microsoft Internet Explorer 5 (IE5) but are not limited thereto. Because the browsers are used for accessing data, there is no headache for maintaining client sites. Moreover, the ISP of the present invention has a built-in search engine in a web server, so that the users on the client sites are able to find the needed reports by inputting some keywords on the browsers. The search engine is constructed with the use of Microsoft Index Server, and arranges all the documents in particular locations in accordance with the document characteristics, so that the index server can conveniently search the documents.

Furthermore, the ISP of the present invention executes the program faster because of the application of loader. The loader generates in advance the daily needed data, such as the data needed for management or production.

Besides, the ISP of the present invention further adopts the concept of Microsoft Distributed interNet Architecture (DNA) for the design of the whole system, and the main advantage thereof is that: different application programs can be executed at different locations and thereafter the data generated is collected in a server. The aforementioned method can lessen the burden of a server, so that the server has the capability to process the other jobs instead of processing numerous complicated reports.

Further, the ISP of the present invention is a three-tier structure. In the three-tier structure, objects in the middle tier participate in various application programs, and can be commonly used by every application program, which means that the objects can be used repeatedly. Application programs in the third tier (client site) only communicate with the objects in the middle tier and do not directly talk to the database server at the first tier (server site), so that the front-end and the back-end sites are independent thereby enhancing the system flexibility and expandability. In other words, there is only one connected to the database server within the three-tier structure unlike common client-server structures having several connections to the database. The three-tier structure of the present invention has the following advantages. First, the devices on the server site do not affect the application programs at the client site. For example, the application programs on the client site do not have to consider the database used at the server site. Secondly, the application programs at the client site do not receive any impact from the complicated network devices at the server site. Thirdly, the shortcomings of inconsistency, lacking reusability and flexibility, etc., due to the two-tier structure overly emphasizing the client site or the server site, are prevented.

The reports, figures or charts gathered in the browsers at the client site with the ISP of the present invention can be directly pasted to Word or Excel for users to do the extra treatment.

Furthermore, the ISP comprises a scheme for detecting the utilization count of each ISP function, and the scheme can be used for inquiring the utilization frequency of each ISP function.

Figure 2:
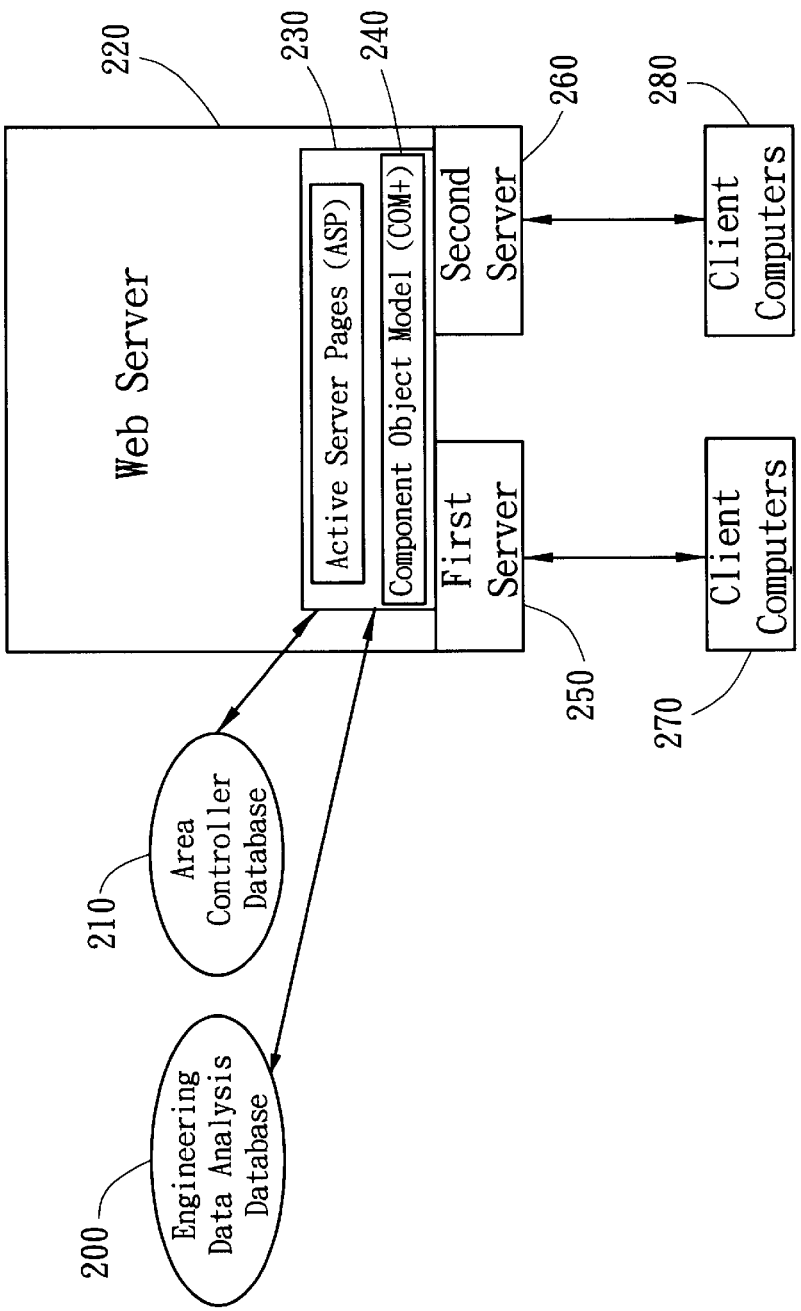
FIG. 2 is a structural diagram of ISP system according to a preferred embodiment of the present invention.

Referring to FIG. 2, this figure is a structural diagram of ISP system according to a preferred embodiment of the present invention. The data-accessing mode shown in FIG. 2 is real time. The ISP of the present invention under the real-time mode comprises an engineering data analysis database (EDB) 200, an area controller database (AC Database) 210, a web server 220, etc. The web server 220 can be, for example, a clustered web server. The so-called clustered means that multiple computers are combined into one, so that if one of the multiple computers is down, the other computers will immediately take over the job belonging to the computer down. The web server 220 is connected to the EDB 200 and to the AC Database 210, and the web server 220 further has an active server pages (ASP) 230 interface. Moreover, the ISP further comprises a plurality of client computers 270 and a plurality of client computers 280, and the client computers 270 and 280 are connected to the web server 220.

FIG. 2 further illustrates a first server 250 used for connecting the client computers 270 to the web server 220, wherein the first server 250 is set up for providing a service to the client computers 270 in the same factory where the EDB 200 and the AC Database 210 are located, and the first server 250 utilizes the internet protocol (IP) addresses to determine if the client computers 270 are permitted to access the data stored in the first server 250.

FIG. 2 further illustrates a second server 260 used for connecting the client computers 280 to the web server 220, wherein the second server 260 is set up for providing a service to the client computers 280 in a plurality of related business groups outside the factory where the EDB 200 and the AC Database 210 are located, and the second server 260 utilizes usernames and passwords to determine if the client computers 280 are permitted to access the data stored in the second server 260.

Figure 3:
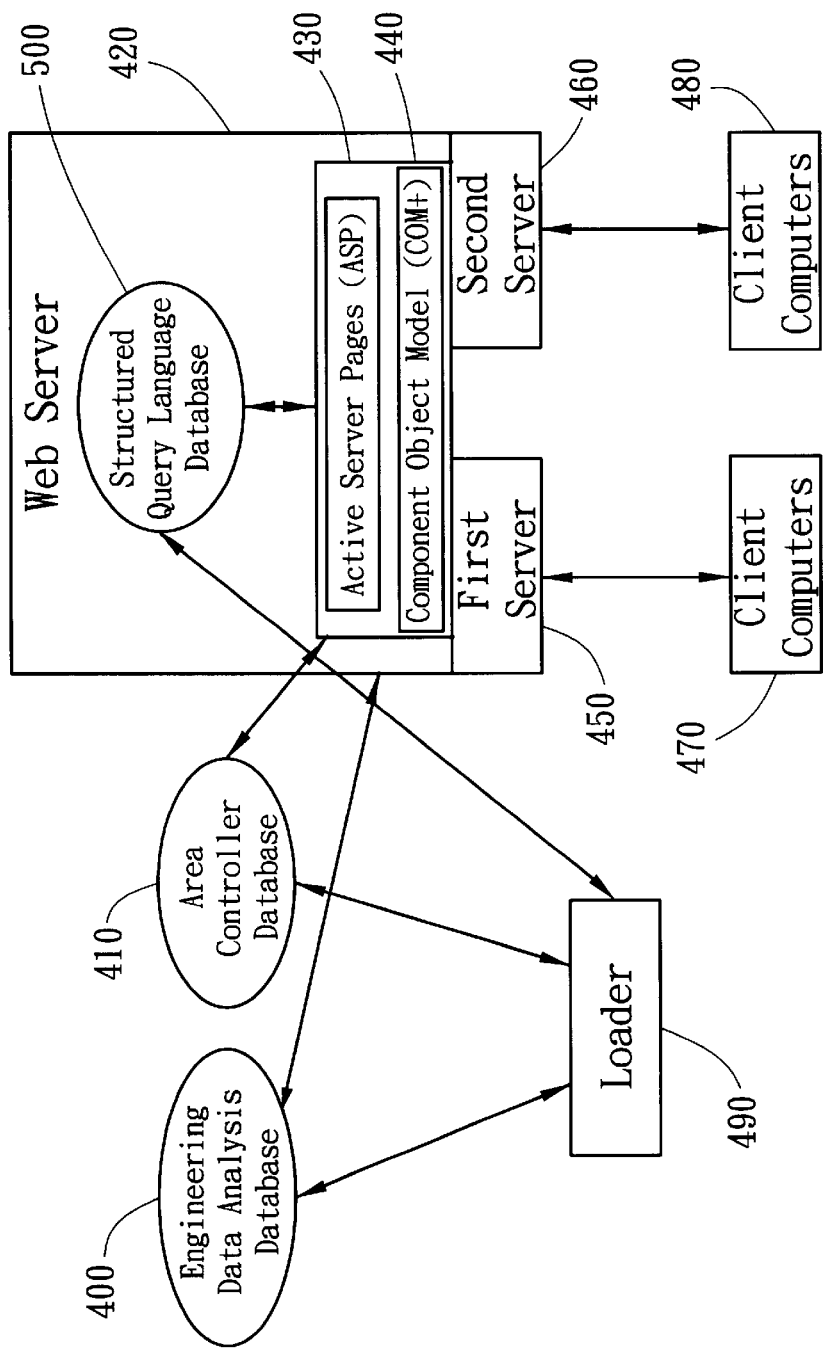
FIG. 3 is a structural diagram of ISP system according to the other preferred embodiment of the present invention.

Referring to FIG. 3, this figure is a structural diagram of ISP system according to the other preferred embodiment of the present invention. The ISP of the other preferred embodiment of the present invention comprises two modes for accessing data, and these two modes are described as follows.

The first mode for accessing data is real time, and the ISP of the present invention under the real-time mode comprises an engineering data analysis database (EDB) 400, an area controller database (AC Database) 410, a web server 420, etc. The web server 420 can be, for example, a clustered web server. The web server 420 is connected to the EDB 400 and to the AC Database 410, and the web server 420 further has an active server pages (ASP) 430 interface. Moreover, the ISP further comprises a plurality of client computers 470 and a plurality of client computers 480, and the client computers 470 and 480 are connected to the web server 420.

The second mode for accessing data allows users to access the data in a certain period of time, and the certain period of time can be, for example, daily, weekly or monthly, etc. The ISP of the present invention under the aforementioned mode of accessing data in a certain period of time comprises an EDB 400; an AC Database 410; a loader 490 connected to the EDB 400 and the AC Database 410; a web server 420 having a structured query language (SQL) database 500 connected to the loader 490; a plurality of client computers 470; and a plurality of client computers 480, wherein the client computers 470 and 480 are connected to the web server 420, and the web server 420 further has an active server pages (ASP) 430 interface.

FIG. 3 further comprises a first server 450 used for connecting the client computers 470 to the web server 420, wherein the first server 450 is set up for providing a service to the client computers 470 in the same factory where the EDB 400 and the AC Database 410 are located, and the first server 450 utilizes the internet protocol (IP) addresses to determine if the client computers 470 are permitted access the data stored in the first server 450.

FIG. 3 further comprises a second server 460 used for connecting the client computers 480 to the web server 420, wherein the second server 460 is set up for providing a service to the client computers 480 in a plurality of related business groups outside the factory where the EDB 400 and the AC Database 410 are located, and the second server 460 utilized usernames and passwords to determine if the client computers 480 are permitted to access the data stored in the second server 460.

To summarize from the above, the present invention are advantageously featured in handling multiple users and multiple jobs at the same time, being compatible with the Office software, accessing data directly with a browser, being a DNA structure, being maintained easily, and being a three-tier structure.

As is understood by a person skilled in the art, the foregoing preferred embodiments of the present invention are illustrative of the present invention rather than limiting of the present invention. They are intended to cover various modifications and similar arrangements included within the spirit and scope of the appended claims, the scope of which should be accorded the broadest interpretation so as to encompass all such modifications and similar structures.

What is claimed is:

1. An integrated service platform (ISP), suitable for use in a manufacturing execution system (MES) utilized in a wafer fab, the ISP comprising:
    an engineering data analysis database(EDB), wherein data of the MES is stored in the EDB;
    an area controller database (AC Database); and
    a web server, wherein the web server is connected respectively to the EDB and the AC Database for accessing the data stored in the EDB and the AC Database, the web server comprising:
        a first server, used for connecting a plurality of client computers to the web server, and serving the client computers located in a factory in which the EDB and the AC Database are located, the first server utilizing an internet protocol (IP) address to determine if the client computers have the right to access data stored in the first server; and
        a second server, used for connecting the client computers to the web server, and the second server serves the client computers in a plurality of related business groups which are located outside the factory in which the EDB and the AC Database are located, the second server utilizing a username and a password to determine if the client computers have the right to access data stored in the second server.

2. The ISP of claim 1, wherein the web server is a clustered web server.

3. The ISP of claim 1, wherein the web server has an active server pages (ASP) interface.

4. The ISP of claim 1, wherein the web server utilizes a component object model (COM) concept to develop a plurality of objects of the ISP.

5. The ISP of claim 1, wherein the web server utilizes a real-time mode for accessing data stored in the EDB and the AC Database.

6. The ISP of claim 1, further comprising a search engine, wherein the search engine is used for finding required data by inputting a keyword at a browser on each of the client computers.

7. An ISP, suitable for use in a manufacturing execution system (MES) utilized in a wafer fab, the ISP comprising:
    an EDB, wherein data of the MES is stored in the EDB;
    an AC Database;
    a loader, wherein the loader is connected to the EDB and the AC Database respectively; and
    a web server, comprising;
        a structured query language (SQL) database, connected to the loader, wherein the loader utilizes in advance a mode of periodically accessing data at an interval of predetermined time so as to first arrange data stored in the EDB and the AC Database and thereafter put the arranged data in the SQL database;
        a first server, used for connecting a plurality of first client computers to the web server, and serving the first client computers in a factory in which the EDB and the AC Database are located, the first server utilizing an IP address to determine if the first client computers have the right to access data stored in the first server, and the data stored in the first server comes from the SQL database, the EDB and the AC Database; and
        a second server, used for connecting a plurality of second client computers to the web server, and serving the second client computers in a plurality of related business groups which are located outside the factory in which the EDB and the AC Database are located, the second server utilizing a username and a password to determine if the second client computers have the right to access data stored in the second server, and the data stored in the first server comes from the SQL database, the EDB and the AC Database.

8. The ISP of claim 7, wherein the ISP is a clustered web server.

9. The ISP of claim 7, wherein the web server has an ASP interface.

10. The ISP of claim 7, wherein the web server utilizes a COM concept to develop objects of the ISP.

11. The ISP of claim 7, further comprising a search engine, wherein the search engine is used for finding required data by inputting a keyword at a browser on each of the client computers.

* * * * *